United States Patent
Palaniappan et al.

(10) Patent No.: US 12,243,556 B2
(45) Date of Patent: Mar. 4, 2025

(54) ARTIFICIAL INTELLIGENT BASED SYSTEM AND METHOD FOR AUGMENTED CONTENT DELIVERY FOR ASSISTING PATIENTS IN NEUROLOGICAL DISORDERS IN NONPHARMACEUTICAL INTERVENTIONS (NPIs) SETTING

(71) Applicants: SBX Technologies Corporation, Tokyo (JP); Aikomi Co. Ltd, Tokyo (JP)

(72) Inventors: Sucheendra Kumar Palaniappan, Tokyo (JP); Vikraman Karunanidhi, Pune (IN); Samik Ghosh, Tokyo (JP); Hiroaki Kitano, Tokyo (JP); Nicholas William Hird, Kobe (JP)

(73) Assignee: SBX Technologies Corporation and Aikomi Co. Ltd, Tokyo (JP)

( * ) Notice: Subject to any disclaimer, the term of this patent is extended or adjusted under 35 U.S.C. 154(b) by 297 days.

(21) Appl. No.: 18/058,892

(22) Filed: Nov. 28, 2022

(65) Prior Publication Data
US 2024/0177728 A1 May 30, 2024

(51) Int. Cl.
*G10L 25/63* (2013.01)
*G06F 40/30* (2020.01)

(52) U.S. Cl.
CPC .............. *G10L 25/63* (2013.01); *G06F 40/30* (2020.01)

(58) Field of Classification Search
CPC ................................ G10L 25/63; G06F 40/30
USPC ................................ 704/231, 239, 246, 251
See application file for complete search history.

(56) References Cited

U.S. PATENT DOCUMENTS

| | | | |
|---|---|---|---|
| 11,037,545 B2 | 6/2021 | Ogawa et al. | |
| 11,279,041 B2 | 3/2022 | Mahoor et al. | |
| 2014/0125678 A1 | 5/2014 | Wang et al. | |
| 2019/0180871 A1* | 6/2019 | Doerflinger | G16H 50/20 |

OTHER PUBLICATIONS

Conversational Affective Social Robots for Ageing and Dementia Support; Maria R. Lima, Graduate Student Member, IEEE, Maitreyee Wairagkar, Manish Gupta, Ferdinando Rodriguez y Baena, Member, IEEE, Payam Barnaghi, Senior Member, IEEE, David J. Sharp, and Ravi Vaidyanathan, Member, IEEE; https://ieeexplore.ieee.org/stamp/stamp.jsp?tp=&amnumber=9548693.

* cited by examiner

*Primary Examiner* — George C Monikang
(74) *Attorney, Agent, or Firm* — Jason C. Cameron

(57) ABSTRACT

A method for assisting a patient through a therapy session using a live real-time voice interaction with a narrative audio is disclosed. The method includes steps of: extracting an emotional content from the set of multimedia in a playlist; calculating an emotional score for each emotional content in the playlist using a deep machine learning model; generating an emotional arc for the emotional content based on the calculated emotional score, previous response from the patient to different genres and personal information of the patient; generating a narrative text from the set of multimedia and generating a narrative text story based on the generated narrative text and the personal information of the patient using an artificial intelligence (AI) story model; converting the generated narrative text story to an audio; and generating a narrative audio by combining the audio file with the emotional arc.

15 Claims, 11 Drawing Sheets

ARTIFICIAL INTELLIGENT BASED SYSTEM AND METHOD FOR AUGMENTED CONTENT DELIVERY FOR ASSISTING PATIENTS IN NEUROLOGICAL DISORDERS IN NONPHARMACEUTICAL INTERVENTIONS (NPIs) SETTING

FIELD OF INVENTION

Embodiments of the present invention relate to neurological disorders, more particularly relate to an artificial intelligence (AI) based system and method for assisting patients with neurological disorders with narrative voice.

BACKGROUND

Neurological disorder such as Alzheimer's disease often are related to loss of cognitive functioning such as thinking, remembering, and reasoning. Patients suffering from neurological disorders fail to perform certain basic daily life activities. Neurological disorders range in severity from the mildest from mildest stage, when it is just beginning to affect a person's functioning, to a most severe stage, when the person must depend completely on others for basic activities of living.

Conventionally, while drugs are being used for treating such conditions, it is increasingly understood that NPIs include but are not limited to an ambit of psychotherapy including cognitive behavioral therapy (CBT), cognitive stimulation therapy (CST), and the like for treating such patients with neurological disorders. Such treatments or therapies include mentally engaging activities such as talking about current or past events, singing, playing word games, or cooking from a recipe, and the like.

Some existing technologies assist persons suffering from neurological disorders through NPIs using psychotherapy which is intended to reduce cognitive decline. For example, social robots interact with humans in a socially tolerable manner, convey intention and conduct therapy sessions in a human-like perceivable way. The social robots are empowered to resolve goals with fellow agents including a human or a robot. The social robots are also employed to take care of people with neurological disorders (i.e., a patient with the neurological disorders) in activities of daily living and to enhance their quality of living by providing therapy to the patient during the therapy session. However, social robots themselves often deliver the content without a narrative element which can often make the session banal. Hence, the people with neurological disorders may get bored with the routine therapy so that the output of the enhancement of patient quality of living becomes low.

For example, one of the existing art discloses a smart and scalable neurological disorders assistant device that converses with a patient in voices familiar with the patient. The device utilizes content learned from the patient and content provided by family, friends, caregivers, and doctors, and autonomously adjusts conversations based on the changing state of the patient's neurological disorders state. The device autonomously controls IoT devices (e.g., doors, elevators, televisions, medical dispensers) to help and assist the neurological disorders patient using oral and IoT sensors.

In another example, Alessandro Russo et al., in their non-patent literature (NPL) paper, Dialogue Systems and Conversational Agents for Patients with neurological disorders: The Human-Robot Interaction, discloses identifying and describing the fundamental characteristics of spoken dialogue systems and their role for supporting human-robot interaction and enabling the communication between socially assistive robots and patients with neurological disorders. Further, the analysis focuses on studies, systems and approaches that have investigated the role of dialogue systems and conversational agents in the interaction with elderly people with neurological disorders.

In yet another example, another existing art discloses an expert system that generates conversational responses, which embodies the domain knowledge of human experts such as psychiatrists, geriatricians, nurses, or social workers. For example, such a system may be pre-programmed to know the optimal conversational responses (with respect to friendly conversation, a therapy session for depression, a reminiscence therapy session to treat neurological disorders, etc) to a multitude of specific conversational inputs, possibly with a branching type of response structure that depends on previous conversation inputs.

In yet another example, yet another existing art discloses robots with emotional and social capabilities, which may be useful for interacting with people in home situations, such as elderly people, patients with Alzheimer's disease, neurological disorders and/or depression, children with autism, or others who may benefit from an interactive social robot. In some embodiments, a companion robot may include a dialog management system that integrates emotional intelligence into spoken dialog with users. For example, rather than simply listening to, understanding, and responding to users' speech, a companion robot may interpret a user's affect (e.g., engagement, frustration, excitement, tone, facial expression, etc.), and produce contextually appropriate responses, facial expressions, and/or neck movements.

For example, FIG. 1 is a general graphical representation of a variation of a pitch and tone 102 of narration provided by a robot to a person with neurological disorders. The graphical representation shows that there is a constant pitch and tone of the narration that is given by the robot to the neurological disorders during the therapy. In addition, there is no background narration aspect to the program. Even though, the above mentioned existing prior art and their processes assist the neurological disorders in providing the therapy, the existing prior art have more complex functionalities, typically slower in operations, and delayed outputs to the neurological disorders.

Hence, there is a need for an improved system and method for assisting neurological disorders patients, to address the aforementioned problems thereof.

SUMMARY

In accordance with one embodiment of the disclosure, a method for assisting a person with neurological disorders through a therapy session (i.e., a behavioural psychotherapy session) using a voice interaction with a narrative audio is disclosed. The method includes the following steps of: (a) extracting, by the hardware processor, emotional content from the set of multimedia in a playlist of content created by an upstream therapy application: (b) calculating, by the hardware processor, an emotional score for each emotional content in the created playlist using a deep machine learning model: (c) generating, by the hardware processor, an emotional arc for each of the emotional content in the created playlist based on the calculated emotional score, a previous response from the patient to a plurality of genres and personal information of the patient: (d) generating, by the hardware processor, a narrative text from the set of multimedia in the created playlist and generating a narrative text story based on the generated narrative text and the personal information of the patient using an artificial intelligence (AI) story model: (e) converting, by the hardware processor, the generated narrative text story to an audio file: (f) generating, by the hardware processor, a narrative audio by combining the audio file from the text to speech conversion subsystem with the emotional arc; and (g) outputting, by the hardware processor, the generated narrative audio to the patient in a voice of a robot.

In an embodiment, the hardware processor calculates the emotional score for each emotional content using the deep machine learning model by following steps of: (a) predicting each of the emotional content from the set of multimedia using a deep neural network (DNN): (b) obtaining information of the various emotions and preferences of the patient that is analyzed from watch history, and personal information of the patient; and (c) applying a multi-layer perception (MLP) regression technique to calculate the emotional score for each of the emotional content in the created playlist based on the predicted emotional content and the obtained information.

The hardware processor further generates the narrative text using the AI story model using the AI story model by following steps of: (a) obtaining the at-least one of: the video content, the audio content, and the image content from the set of multimedia in the created playlist: (b) obtaining the personal information comprising likes, dislikes, and key elements from life events of the patient; and (c) correlating the obtained contents of the set of multimedia in the created playlist and the obtained personal information to generate the narrative text using generative adversarial network (GAN) of the artificial intelligence (AI) story model.

In one aspect, a system for assisting a person with neurological disorders through a behavioural psychotherapy (i.e., NPIs for neurological disease) using a voice interaction with a narrative audio is disclosed. The system includes a hardware processor and a memory. The memory is coupled to the hardware processor and the memory includes a set of program instructions in the form of a plurality of subsystems configured to be executed by the hardware processor. The plurality of subsystems includes a content extraction subsystem, an emotional score calculation subsystem, an emotional arc generation subsystem, a narrative story generation subsystem, a text to speech conversion subsystem, a narrative audio generator subsystem, and a narrative voice output subsystem.

The content extraction subsystem extracts emotional content from the set of multimedia in a playlist. The emotional score calculation subsystem calculates an emotional score for each emotional content in the created playlist using a deep machine learning model. The emotional arc generation subsystem generates an emotional arc for each of the emotional content in the created playlist based on the calculated emotional score, a previous response from the patient to a plurality of genres and personal information of the patient. The narrative story generation subsystem generates a narrative text from the set of multimedia in the created playlist and generate a narrative text story based on the generated narrative text and the personal information of the patient using an artificial intelligence (AI) story model. The text to speech conversion subsystem converts the generated narrative text story to an audio file. The narrative audio generator subsystem generates a narrative audio by combining the audio file from the text to speech conversion subsystem with the generated emotional arc. The narrative voice output system outputs the generated narrative audio to the patient in a voice of a robot.

In an embodiment, the system further includes a voice modulation subsystem that is configured to modulate the generated narrative audio including realistic voices and speeches into patient's favorite speaker's voice in a favorite language using a generative AI model based on the personal information of the patient. The voice modulation subsystem (a) captures the patient emotional arc from the generated emotional score and history of the patient, and (b) modulate the narrative audio with the corresponding pitch and tone in the robot's voice based on a value of the generated emotional arc.

In another embodiment, the system further includes a display unit for displaying a curated playlist to the patient.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
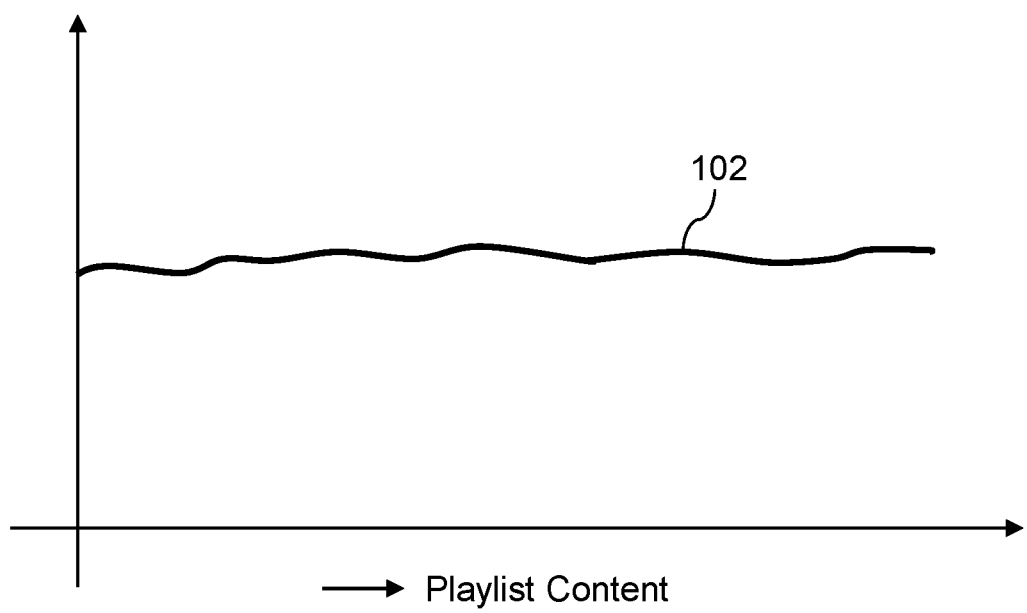
FIG. 1 is a graphical representation of a variation of a pitch and tone of narration provided by a robot to a person with neurological disorders, in accordance with the prior art.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated online platform, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or subsystems or elements or structures or components preceded by "comprises . . . a" does not, without more constraints, preclude the existence of other devices, subsystems, elements, structures, components, additional devices, additional subsystems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

A computer system (standalone, client or server computer system) configured by an application may constitute a "module" (or "subsystem") that is configured and operated to perform certain operations. In one embodiment, the "module" or "subsystem" may be implemented mechanically or electronically, so a module include dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired) or temporarily configured (programmed) to operate in a certain manner and/or to perform certain operations described herein.

Figure 2:
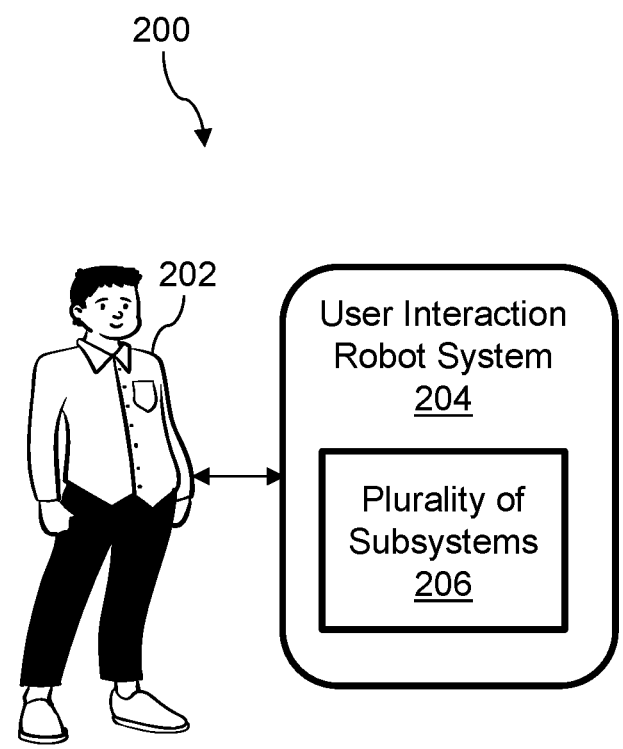
FIG. 2 is a block diagram of a system for assisting a neurological disorders patient (i.e., a person with neurological disorders (a patient)) in a robot driven therapy session with narrative voice/audio using a user interaction robot system, in accordance with an embodiment of the present disclosure.

FIG. 2 is a block diagram of a system 200 for assisting a neurological disorders patient (i.e., a person with neurological disorders (patient) 202) in a robot driven therapy session (i.e., a psychotherapy session) with narrative voice/audio using a user interaction robot system 204, in accordance with an embodiment of the present disclosure. The system 200 includes the person with neurological disorders (i.e., a patient) 202 and the user interaction robot system 204. In an embodiment, the neurological disorders includes at-least one of: Alzheimer's disease, Amyotrophic Lateral Sclerosis (ALS), Ataxia, Cerebral Aneurysm, and the like. The user interaction robot system 204 includes a plurality of subsystems 206. In an embodiment, the user interaction robot system 204 in the system 200 enhances the interaction with the patient 202 in the therapy session using at-least one of: a live real-time voice interaction and a near live real-time voice interaction with a narrative element (i.e., an audio/voice) in a background with respect to a given playlist. The system 200 utilizes a deep machine learning model to calculate an emotional score for each emotional content in the playlist.

The system 200 further generates an emotional arc for each of the emotional content in the playlist based on the calculated emotional score, previous response from the patient 202 to different genres and personal information of the patient 202. The system generates a narrative text story based on a generated narrative text and the personal information of the patient 202 using an artificial intelligence (AI) story model. Finally, the system 200 generates a narrative audio by combining an audio file from the generated narrative text story with the emotional arc. In an embodiment, the narrative audio is modulated with a corresponding pitch and tone based on a value of the generated emotional arc. In an embodiment, the user interaction robot system 204 is comprised in a robot. In an embodiment, the robot acts as a computing system. In another embodiment, user interaction robot system 204 is comprised in the computing system that includes at-least one of: a mobile phone, a smart phone, a laptop, a personal computer, a personal digital assistant (PDA), and the like.

Figure 3:
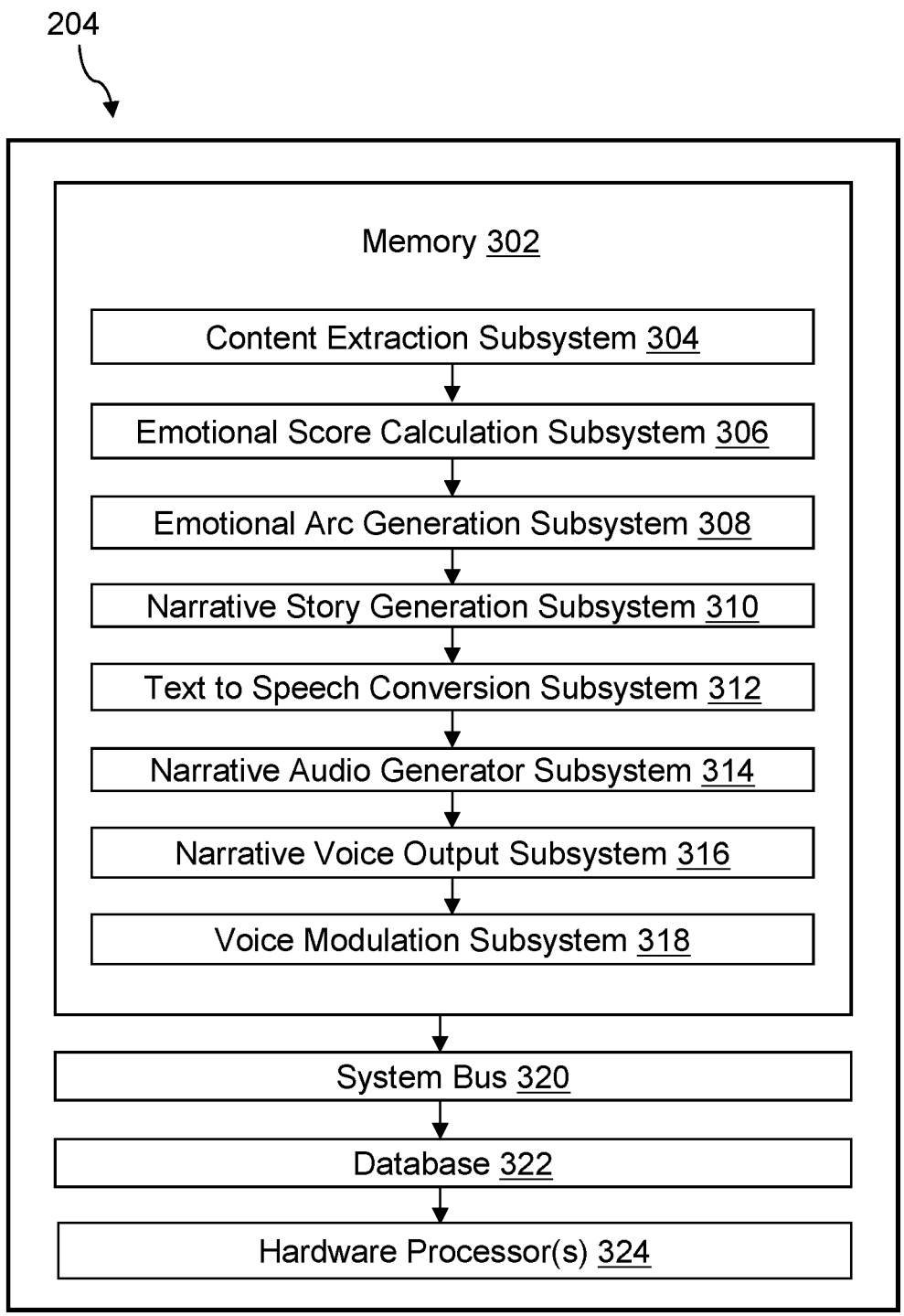
FIG. 3 is a block diagram illustrating an exemplary user interaction robot system, such as those shown in FIG. 2, in accordance with an embodiment of the present disclosure.

FIG. 3 is a block diagram illustrating an exemplary user interaction robot system 204, such as those shown in FIG. 2, in accordance with an embodiment of the present disclosure. The user interaction robot system 204 includes a hardware processor 324. The user interaction robot system 204 also includes a memory 302 coupled to the hardware processor 324. The memory 302 includes a set of program instructions in the form of the plurality of subsystems 206.

The hardware processor(s) 324, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 302 includes the plurality of subsystems 206 stored in the form of executable program which instructs the hardware processor 324 via a system bus 320 to perform the above-mentioned method steps. The plurality of subsystems 206 include following subsystems: a content extraction subsystem 304, an emotional score calculation subsystem 306, an emotional arc generation subsystem 308, a narrative story generation subsystem 310, a text to speech conversion subsystem 312, a narrative audio generator subsystem 314, a narrative voice output subsystem 316, and a voice modulation subsystem 318.

Computer memory elements may include any suitable memory device(s) for storing data and executable program, such as read only memory, random access memory, erasable programmable read only memory, electronically erasable programmable read only memory, hard drive, removable media drive for handling memory cards and the like. Embodiments of the present subject matter may be implemented in conjunction with program modules, including functions, procedures, data structures, and application programs, for performing tasks, or defining abstract data types or low-level hardware contexts. Executable program stored on any of the above-mentioned storage media may be executable by the hardware processor(s) 324.

The user interaction robot system 204 further includes the content extraction subsystem 304 that is communicatively connected to the hardware processor 324. The content extraction subsystem 304 extracts emotional content from a set of multimedia in a playlist. In an embodiment, the playlist of content is created by an upstream therapy application. The user interaction robot system 204 further includes the emotional score calculation subsystem 306 that is communicatively connected to the hardware processor 324. The emotional score calculation subsystem 306 obtains the input of the multimedia including a plurality of emotional contents. The emotional score calculation subsystem 306 calculates an emotional score for each of the obtained emotional contents in the created playlist using a deep machine learning model. In an embodiment, the emotional content is related to at-least one of: happiness, sadness, surprise, fear, anger, disgust, and contempt. In another embodiment, the emotional content related to the happiness, sadness, surprise, fear, anger, disgust, and contempt in the form of an image, an audio or a video based contents in the created playlist.

The emotional score calculation subsystem 306 calculates the emotional score for every content using the deep machine learning model by (a) predicting each of the emotional content from the set of multimedia using a deep neural network (DNN), (b) obtaining information of the various emotions and preferences of the patient 202 that is analyzed from watch history, and personal information of the patient 202, and applying a multi-layer perception (MLP) regression technique to calculate the emotional score for each of the emotional content in the created playlist based on the predicted emotional content and the obtained information. In an embodiment, the emotional content is predicted from the image of the multimedia to calculate the emotional score for the image using the deep neural network. In another embodiment, the emotional content is predicted from the audio of the multimedia to calculate the emotional score based on a spectrogram of the audio using the deep neural network.

The user interaction robot system 204 further includes the emotional arc generation subsystem 308 that is communicatively connected to the hardware processor 324. The emotional arc generation subsystem 308 generates an emotional arc for each of the emotional contents in the created playlist based on the calculated emotional score, a previous response from the patient 202 to a plurality of genres and personal information of the patient 202. In an embodiment, the previous response to the plurality of genres/category includes features including at-least one of: (a) various emotions related to joy, sadness, surprise, anger, and the like, and (b) communication such as a conversation that is initiated by the patient 202 and a conversation that is initiated by a caretaker of the patient 202 during the therapy session.

In an embodiment, the emotional arc generated based on the emotional content with the emotional score is directly proportional to the generated narrative audio. In an embodiment, the emotional content with high emotional score indicating a happy emotion to the patient 202 is caused to increase the pitch and tone of the narrative audio. In another embodiment, the emotional content with low emotional score indicating a sadness emotion to the patient 202 is caused to reduce the pitch and tone of the narrative audio.

The user interaction robot system 204 further includes the narrative story generation subsystem 310 that is communicatively connected to the hardware processor 324. The narrative story generation subsystem 310 generates a narrative text (i.e., a narrative script) from the set of multimedia in the created playlist. Further, the narrative story generation subsystem 310 generates a narrative text story based on the generated narrative text and the personal information of the patient 202 using an artificial intelligence (AI) story model.

The narrative story generation subsystem 310 generates the narrative text using the AI story model by (a) obtaining the at-least one of: the video content, the audio content, and the image content from the set of multimedia in the playlist. (b) obtaining the personal information comprising likes, dislikes, and key elements from life events (e.g., episodes from life) of the patient 202, and (c) correlating the obtained contents of the set of multimedia in the playlist and the obtained personal information to generate the narrative text using generative adversarial network (GAN) of the artificial intelligence (AI) story model.

The user interaction robot system 204 further includes the text to speech conversion subsystem 312 that is communicatively connected to the hardware processor 324. The text to speech conversion subsystem 312 converts the generated narrative text story to an audio file. The user interaction robot system 204 further includes the narrative audio generator subsystem 314 that is communicatively connected to the hardware processor 324. The narrative audio generator subsystem 314 generates a narrative audio by combining the audio file from the text to speech conversion subsystem 312 with the generated emotional arc. In an embodiment, the narrative audio is modulated with corresponding pitch and tone based on a value of the generated emotional arc. The user interaction robot system 204 further includes the narrative voice output subsystem 316 that is communicatively connected to the hardware processor 324. The narrative voice output subsystem 316 that outputs the generated narrative audio to the patient in a voice of a robot.

The user interaction robot system 204 further includes the voice modulation subsystem 318 that is communicatively connected to the hardware processor 324. The voice modulation subsystem 318 tunes the generated narrative audio comprising realistic voices and speeches into patient's 202 favorite speaker's voice in a favorite language using a generative AI model based on the personal information of the patient 202. In an embodiment, the personal information of the patient 202 includes at-least one likes of the content, dislikes of the content, watch history of the content, key elements from life events of the patient 202, and the like. In an embodiment, the voice modulation subsystem 318 captures the generated emotional arc from the generated emotional score and history of the patient 202 and modulates the narrative audio with the corresponding pitch and tone in the robot's voice based on a value of the generated emotional arc.

Figure 4:
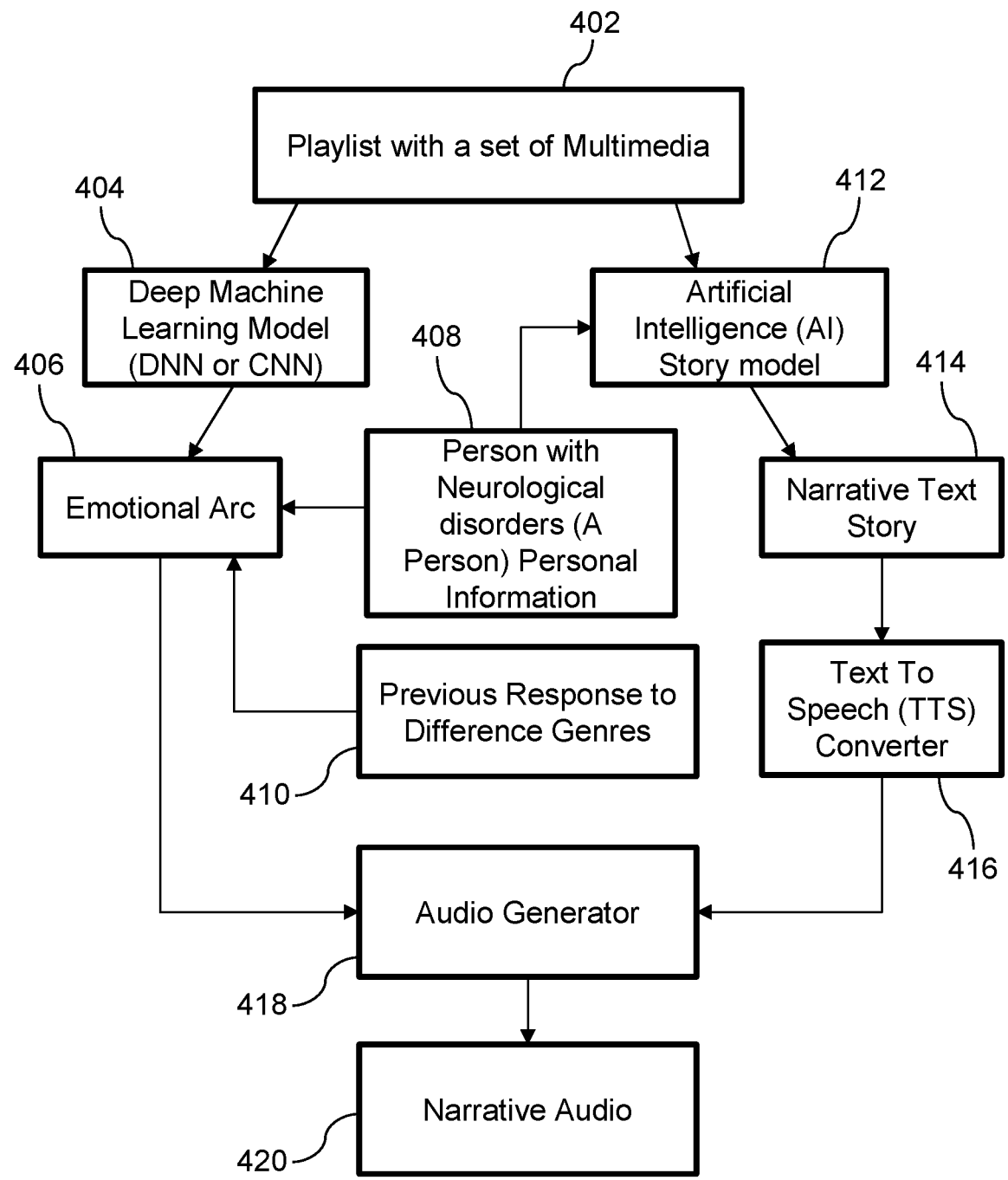
FIG. 4 is a process flow for assisting the person with neurological disorders in a robot driven therapy session with a generated narrative audio using the user interaction robot system, such as those shown in FIG. 2, in accordance with an embodiment of the present disclosure.

FIG. 4 is a process flow for assisting the person with neurological disorders 202 in a robot driven therapy session with a generated narrative audio using the user interaction robot system 204, such as those shown in FIG. 2, in accordance with an embodiment of the present disclosure. At step 402, the user interaction robot system 204 creates the playlist with a set of multimedia including an image, a video, and an audio contents. At step 404, the playlist is sent to the deep machine learning model (e.g., a deep neural network or a convolutional neural network) to analyze the content of the set of multimedia to calculate the emotional score for each of the contents. At step 406, the emotional arc is generated for each of the contents based on the calculated emotional score, previous response from the patient 202 to different genres, as shown at step 408 and personal information of the patient 202, as shown at step 410. Further, at step 412, the playlist is inputted to the AI story model to generate the narrative text story, as shown at step 414. In an embodiment, the AI story model receives the personal information of the patient 202 for generating the narrative text story, as shown at step 414.

At step 416, the narrative text story is converted an initial audio file. Further, the audio file and the generated emotional arc are inputted to the audio generator, as shown at step 418. The audio generation at step 418, processes the audio file and the generated emotional arc to generate the narrative audio/voice, as shown at step 420.

Figure 5A:
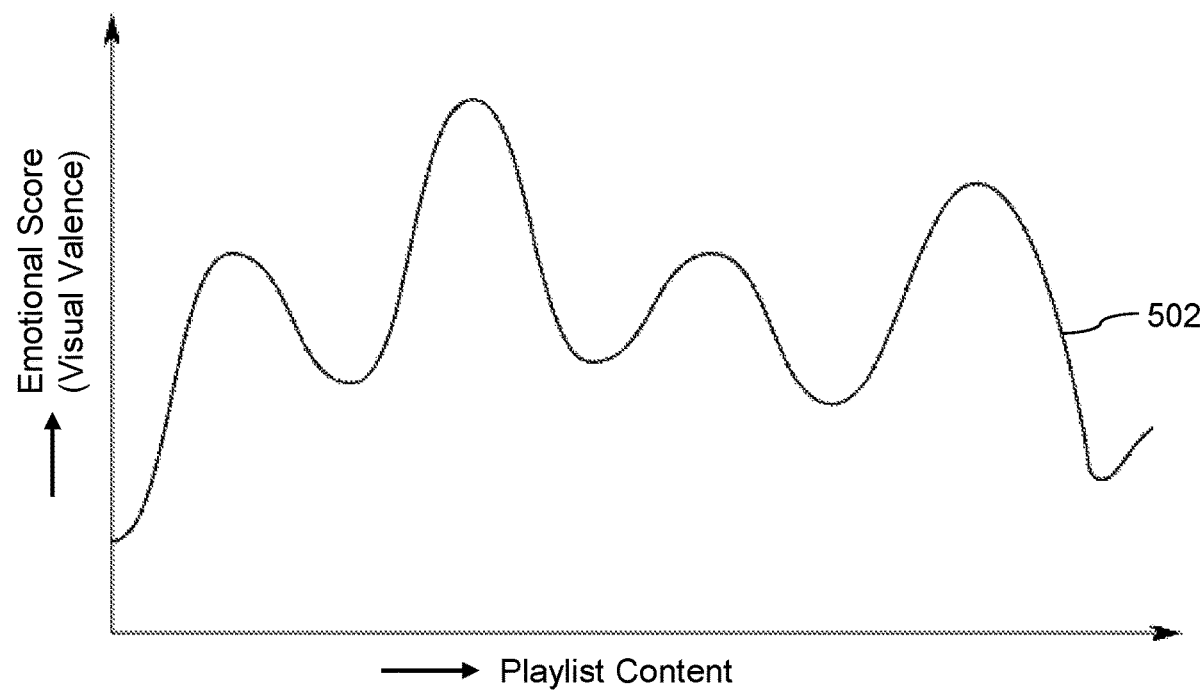
FIG. 5A is a graphical representation illustrating emotional score variation over time based on contents in a playlist and their emotional score along with responses from the patient to contents, in accordance with an embodiment of the present disclosure.
Figure 5B:
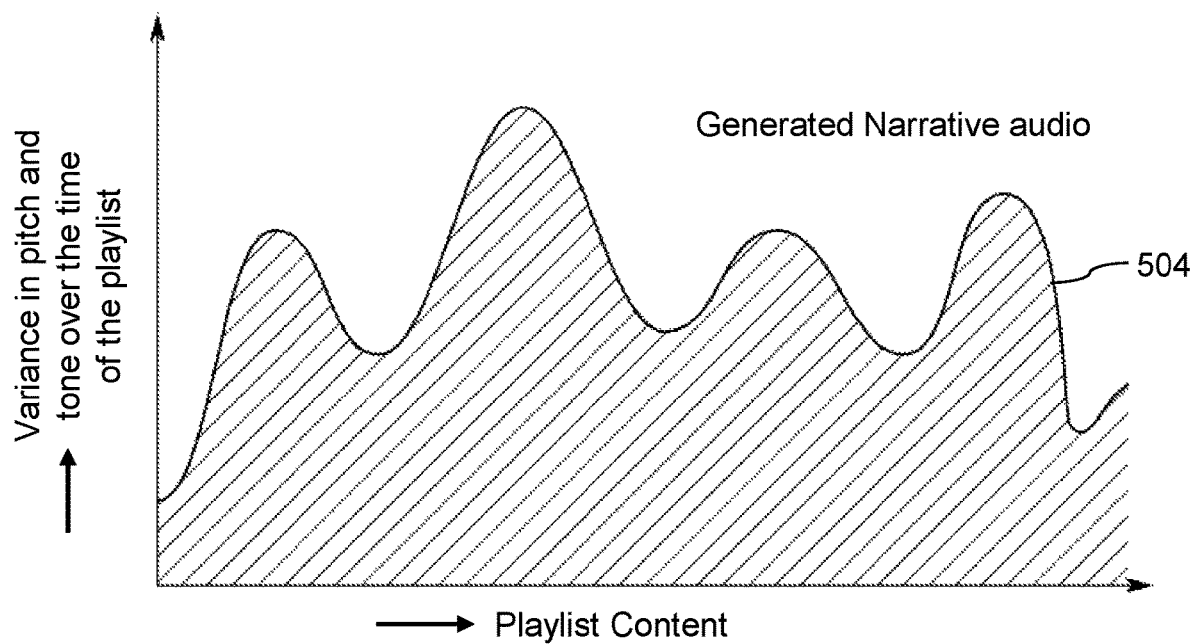
FIG. 5B is a graphical representation illustrating the generated narrative audio with a modulation of a pitch and tone, in accordance with a score and a line graph, such as those shown in FIG. 5A, in accordance with an embodiment of the present disclosure.

FIG. 5A is a graphical representation illustrating the emotional score variation over time 502 based on contents in a playlist and their emotional score along with the responses from the patient to the contents, in accordance with an embodiment of the present disclosure. The graph shows that line graph 502 is generated based on the emotional score calculated for the contents of the set of multimedia in the playlist. FIG. 5B is a graphical representation illustrating the generated narrative audio with a modulation of a pitch and tone 504, in accordance with the score and the line graph as shown in 502, such as those shown in FIG. 5A, in accordance with an embodiment of the present disclosure. The graph shows that the emotional arc is generated with modulated pitch and tone 504 corresponding to the emotional contents of the set of multimedia in the playlist and a value of the emotional arc, as shown in 502.

Figure 6:
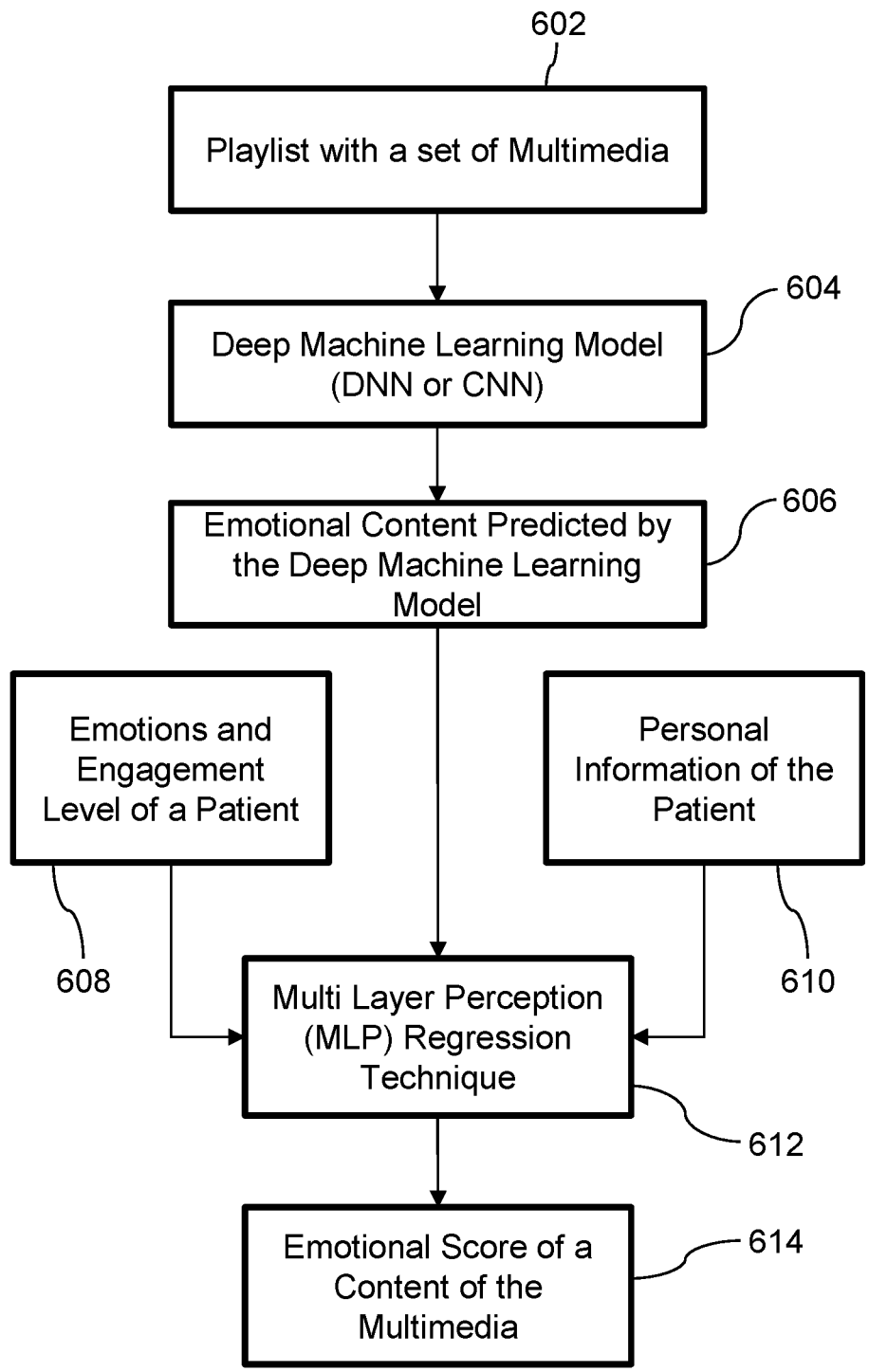
FIG. 6 is a process flow for generating emotional score of a content of a multimedia in the play list using a deep machine learning model, in accordance with an embodiment of the present disclosure.

FIG. 6 is a process flow for generating emotional score of a content of a multimedia in the playlist using a deep machine learning model, in accordance with an embodiment of the present disclosure. At step 602, the user interaction robot system 204 creates the playlist with a set of multimedia including the image, the video, and the audio contents. At step 604, the playlist is sent to the deep machine learning model (e.g., a deep neural network (DNN) or a convolutional neural network (CNN)). At step 606, each of the emotional content is predicted from the set of multimedia using the deep machine learning model. In an embodiment, the emotional content is predicted from the set of multimedia using the deep neural network (DNN). In another embodiment, the emotional content is predicted from the set of multimedia using the convolutional neural network (CNN).

At step 608, emotions, and engagement level of the patient 202 including watch history of the content, various emotions provided by the patient 202 are inputted to a multi-layer perception (MLP) regressor. At step 610, the personal information of the patient 202 including likes, dislikes of the contents, and key elements of the life events of the patient 202 are also inputted to the multi-layer perception (MLP) regressor. At step 612, The MLP regressor obtains the emotions, and engagement level of the patient 202 and the personal information of the patient 202 and applies the MLP regression technique to calculate the emotional score of a particular content of the set of multimedia in the playlist, as shown at step 614.

Figure 7:
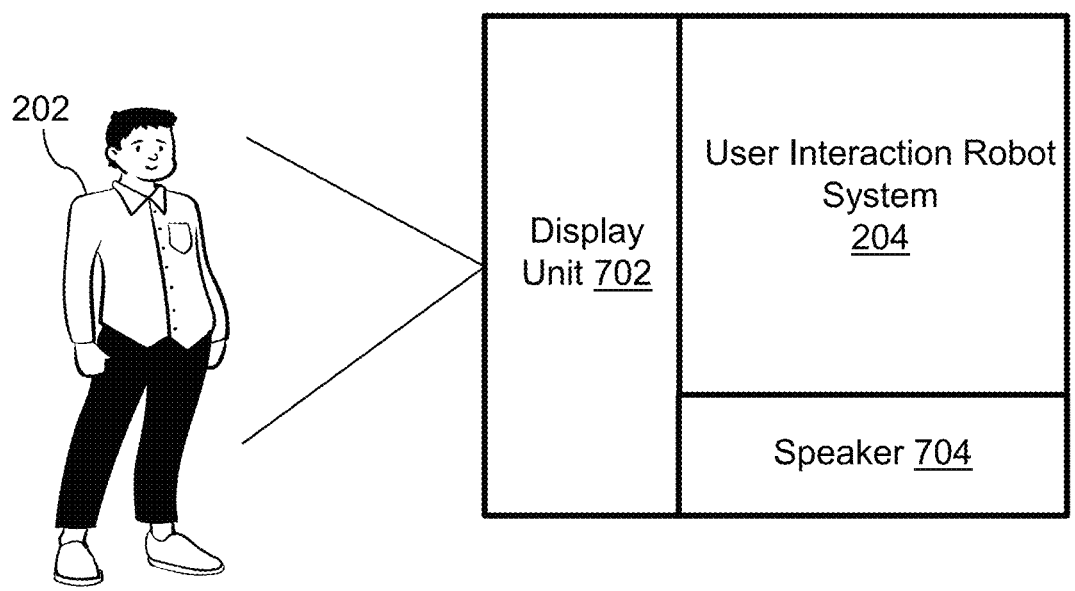
FIG. 7 is a block diagram of the user interaction robot system including a display unit for displaying a curated playlist to the patient, in accordance with an embodiment of the present disclosure.

FIG. 7 is a block diagram of the user interaction robot system 204 including a display unit 702, in accordance with an embodiment of the present disclosure. The user interaction robot system 204 includes the display unit 702 for displaying the curated playlist to the patient 202 and a speaker 704 for spreading the narrative voice/audio to the patient 202.

Figure 8:
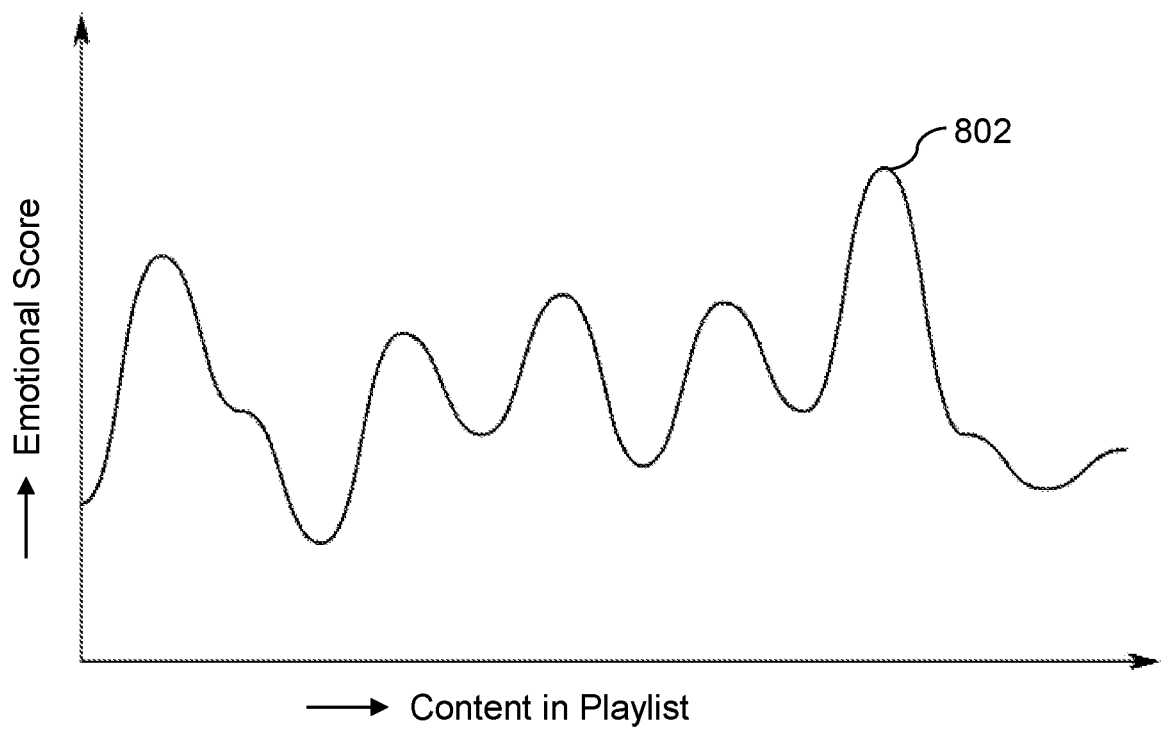
FIG. 8 is a graphical representation illustrating a generation of an emotional arc based on the contents in the playlist and the generated emotional score, in accordance with an embodiment of the present disclosure.

FIG. 8 is a graphical representation illustrating a generation of an emotional arc 802 based on the contents in the playlist and the generated emotional score, in accordance with an embodiment of the present disclosure. The graph shows the generation of the emotional arc 802 based on the emotional score for each of the content of the set of multimedia in the playlist. The generated emotional arc helps to modulate the narrative audio with corresponding pitch and tone, as shown in FIG. 8.

Figure 9:
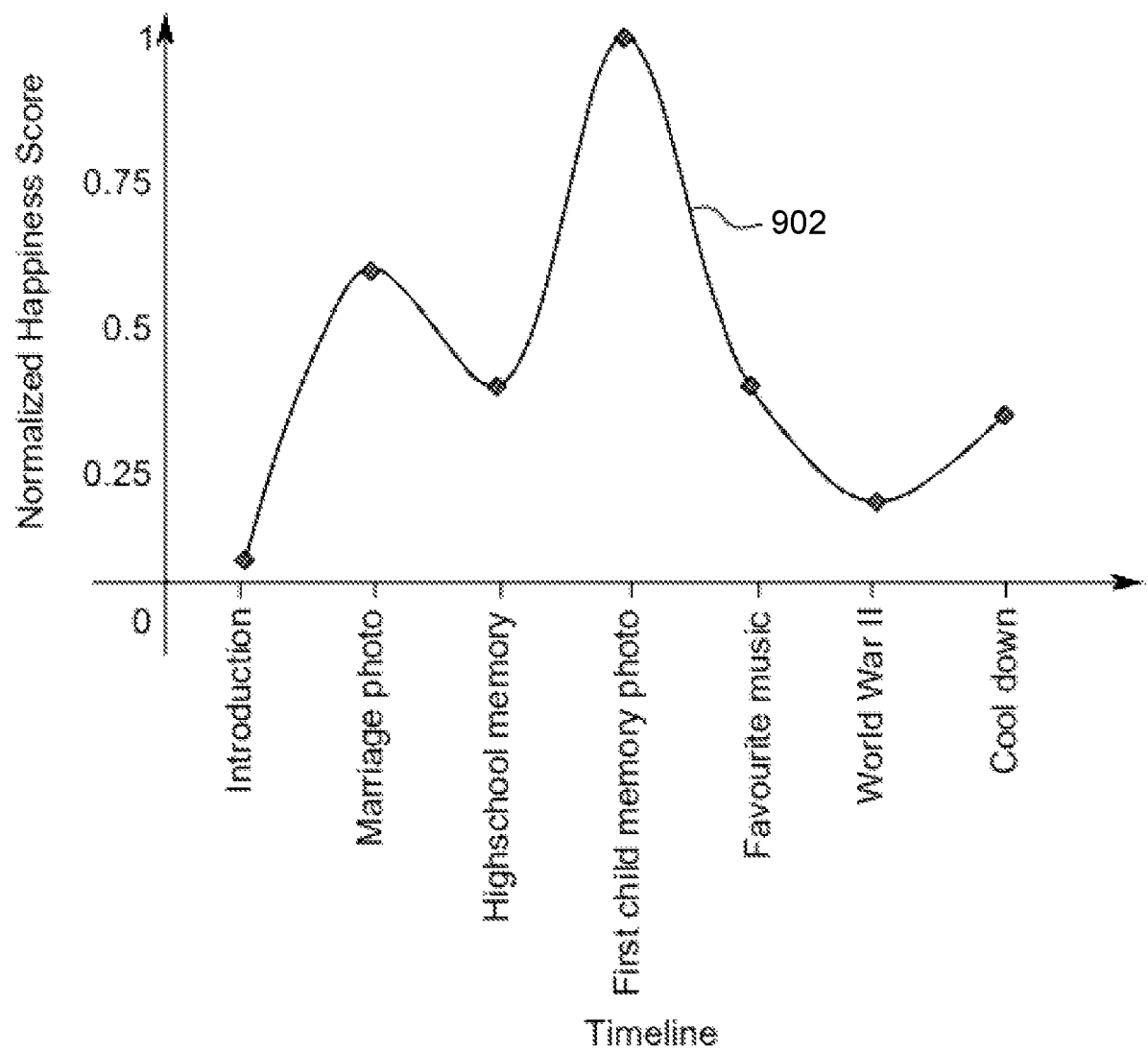
FIG. 9 is a graphical representation illustrating a generation of the emotional arc based on the personal information of the patient and various emotions of the patient, in accordance with an embodiment of the present disclosure.

FIG. 9 is a graphical representation illustrating a generation of the emotional arc 902 based on the personal information of the patient 202 and various emotions of the patient 202, in accordance with an embodiment of the present disclosure. The graph shows that the emotional arc 902 is generated based on the personal information of the patient 202 including likes, dislikes of the content by the patient 202, key elements of life events (e.g., episodes in life such as introduction, marriage photo, high school memory, first child memory photo, favourite music, World War II, cool down, and the like) with respect to the emotional score that is calculated based on the emotions expressed to the events. The emotional arc 902 includes the emotional scores of individual content across the timeline.

For example, the patient 202 expresses happiness when he/she looks at the content related to his marriage photo, so that the pitch and tone of the narrative audio is modulated/increased based on the value of the generated emotional arc in the different timeline. In another example, the patient 202 expresses sadness when he/she looks at the content related to World War II, so that the pitch and tone of the narrative audio is decreased based on the value of the generated emotional arc in the different timeline.

Figure 10:
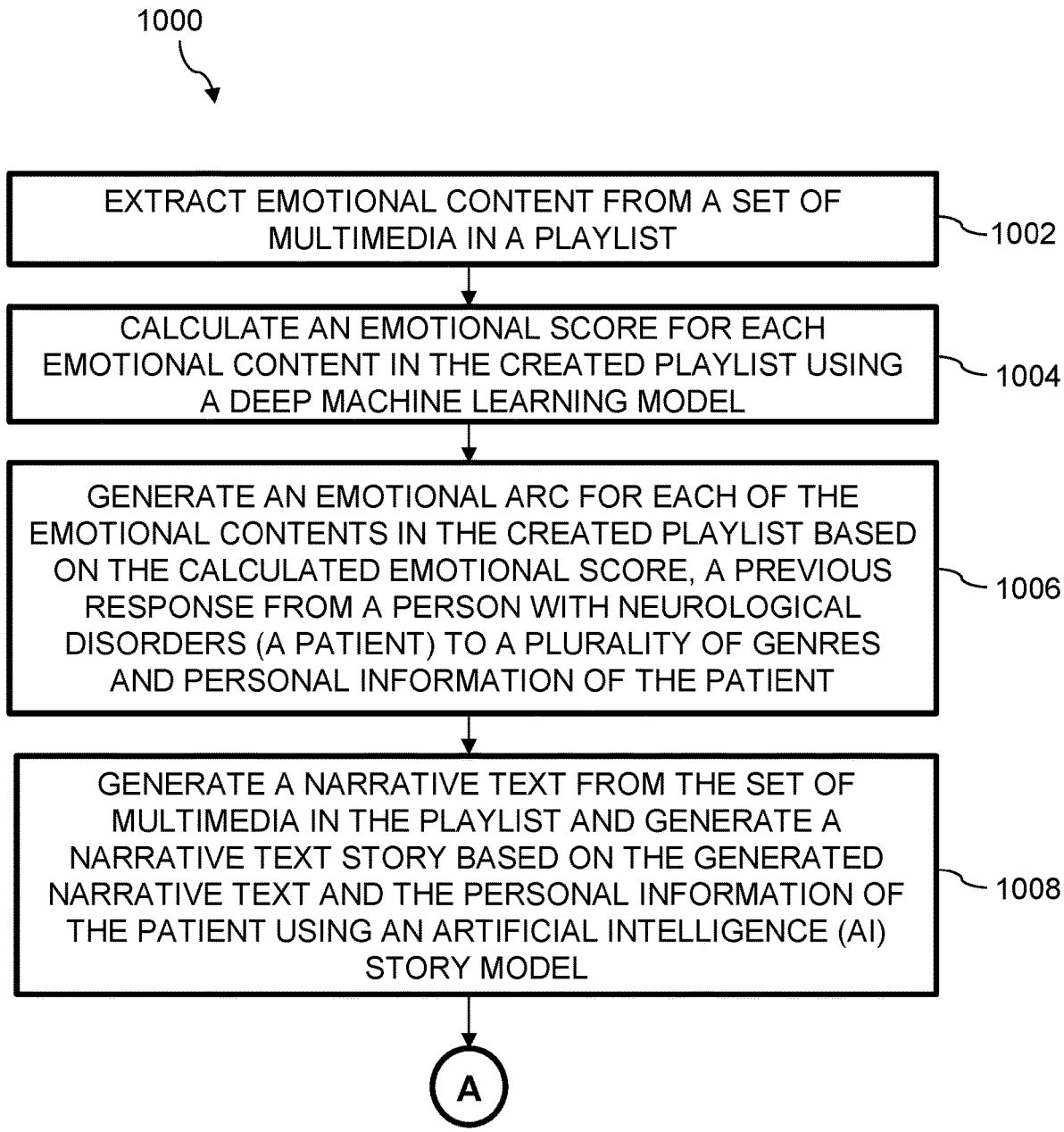
FIG. 10 is a flowchart illustrating a computer implemented method for assisting the neurological disorders patient (i.e., the person with neurological disorders (patient)) in the robot driven therapy session with narrative voice/audio using the user interaction robot system, in accordance with an embodiment of the present disclosure.
Figure 10:
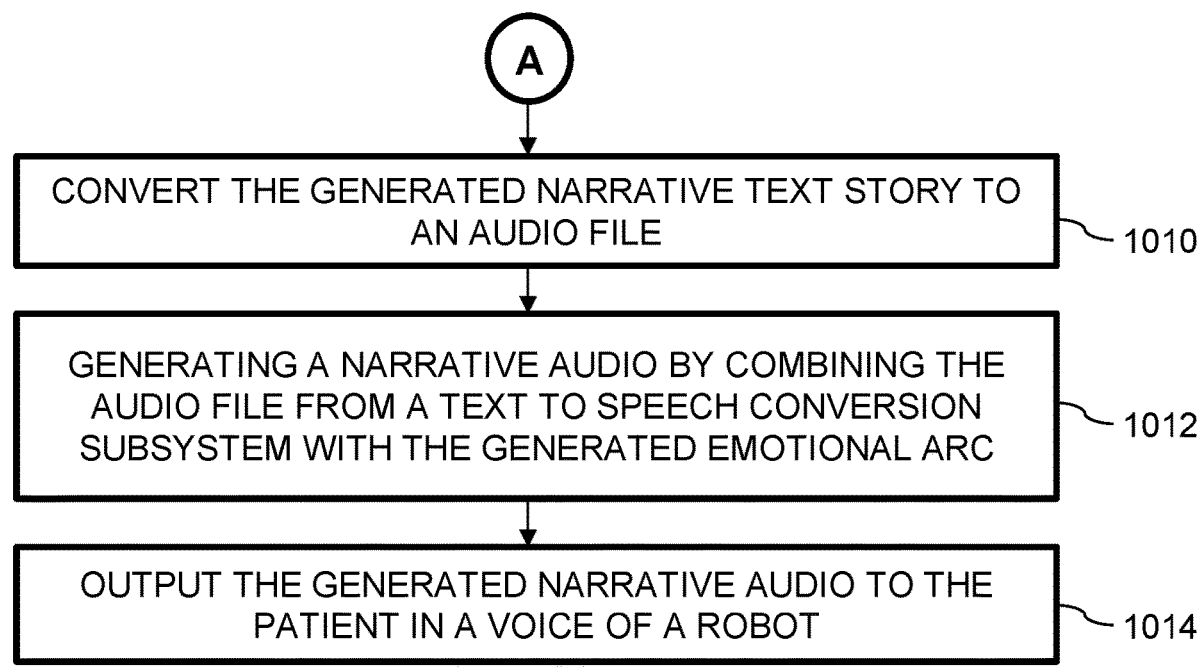

FIG. 10 is a flowchart illustrating a computer implemented method 1000 for assisting the neurological disorders patient (i.e., the person with neurological disorders (patient)) 202 in the robot driven therapy session with narrative voice/audio using the user interaction robot system 204, in accordance with an embodiment of the present disclosure. At step 1002, the content extraction subsystem 304 extracts emotional content from the set of multimedia in the created playlist. At step 1004, the emotional score calculation subsystem 306 calculates an emotional score for each emotional content in the created playlist using a deep machine learning model. The deep machine learning model (a) predicts each of the emotional content from the set of multimedia using either the deep neural network (DNN) or the convolutional neural network (CNN), (b) obtains information of the various emotions and the preferences of the patient 202 that is analyzed from watch history, and the personal information of the patient 202, and (c) applies the multi-layer perception (MLP) regression technique to calculate the emotional score for each of the emotional content in the created playlist based on the predicted emotional content and the obtained information.

At step 1006, the emotional arc generation subsystem 308 generates the emotional arc for each of the emotional content in the created playlist based on the calculated emotional score, the previous response from the patient 202 to the plurality of genres and personal information of the patient 202. In an embodiment, the response to the plurality of genres comprise features that includes the various emotions and communications initiated by at-least one of: the patient 202 and a caretaker of the patient 202.

At step 1008, the narrative story generation subsystem 310 generates the narrative text from the set of multimedia in the created playlist and generates the narrative text story based on the generated narrative text and the personal information of the patient 202 using an artificial intelligence (AI) story model. The narrative story generation subsystem 310 utilizes the AI story model to (a) obtain the at-least one of: the video content, the audio content, and the image content from the set of multimedia in the created playlist, (b) obtain the personal information comprising likes, dislikes, and the key elements from life events of the patient 202, and (c) correlate the obtained contents of the set of multimedia in the created playlist and the obtained personal information for generating the narrative text using generative adversarial network (GAN) of the artificial intelligence (AI) story model.

At step 1010, the text to speech conversion subsystem 312 converts the generated narrative text story to an audio file. At step 1012, the narrative audio generator subsystem 314 generates the narrative audio by combining the audio file from the text to speech conversion subsystem 312 with the generated emotional arc. In an embodiment, the narrative audio is modulated with corresponding pitch and tone based on a value of the generated emotional arc. At step 1014, the narrative voice output system 316 outputs the generated narrative voice audio to the patient 202 in a voice of a robot.

In an embodiment, the voice modulation subsystem 318 modulates the generated narrative audio including realistic voices and speeches into patient's 202 favorite speaker's voice in a favorite language using a generative AI model based on the personal information of the patient 202. In another embodiment, the voice modulation subsystem 318 (*a*) capture the generated emotional arc from the generated emotional score and history of the patient 202, and (b) modulate the narrative audio with the corresponding pitch and tone in the robot's voice based on a value of the generated emotional arc.

The present disclosure provides the user interaction robot system 204 that generates the narrative audio or voice with the modulated pitch and tone based on the emotions of the patient 202, which means that the system 200 captures the emotional arc of the timeline by varying the pitch and tone in the robot system's voice accordingly. The present disclosure further provides the system 200 that helps to modulate the generated narrative audio comprising realistic voices and speeches into patient's 202 favorite speaker's voice in a favorite language using a generative AI model based on the personal information of the patient 202.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, and the like. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Input/output (I/O) devices (including but not limited to keyboards, displays, pointing devices, and the like.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at-least one processor or central processing unit (CPU). The CPUs are interconnected via system bus 320 to various devices such as a random-access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/ article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, and the like, of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

What is claimed is:

1. A method for assisting a neurological disorders patient through a therapy session using a voice interaction with a narrative audio, wherein the neurological disorders patient is a person with neurological disorders (a patient), the method comprising:
    extracting, by the hardware processor, emotional content from the set of multimedia in a playlist, wherein the playlist of content is created by an upstream therapy application;
    calculating, by the hardware processor, an emotional score for each emotional content in the created playlist using a deep machine learning model, wherein the emotional content is related to at-least one of: happiness, sadness, surprise, fear, anger, disgust, and contempt;
    generating, by the hardware processor, an emotional arc for each of the emotional content in the created playlist based on the calculated emotional score, a previous response from the patient to a plurality of genres and personal information of the patient, wherein the response to the plurality of genres comprises features that comprise various emotions and communications initiated by at-least one of: the patient and a caretaker of the patient;
    generating, by the hardware processor, a narrative text from the set of multimedia in the created playlist and generating a narrative text story based on the generated narrative text and the personal information of the patient using an artificial intelligence (AI) story model;
    converting, by the hardware processor, the generated narrative text story to an audio file;
    generating, by the hardware processor, a narrative audio by combining the audio file from the text to speech conversion subsystem with the emotional arc, wherein the narrative audio is modulated with corresponding pitch and tone based on a value of the generated emotional arc; and
    outputting, by the hardware processor, the generated narrative audio to the patient in a voice of a robot.

2. The method of claim 1, wherein calculating the emotional score for each emotional content using the deep machine learning model comprises:
    predicting, by the hardware processor, each of the emotional content from the set of multimedia using a deep neural network (DNN);
    obtaining, by the hardware processor, information of the various emotions and preferences of the patient that is analyzed from watch history, and personal information of the patient; and
    applying, by the hardware processor, a multi-layer perception (MLP) regression technique to calculate the emotional score for each of the emotional content in the created playlist based on the predicted emotional content and the obtained information.

3. The method of claim 1, wherein generating the narrative text using the AI story model comprising:
    obtaining, by the hardware processor, the at-least one of: the video content, the audio content, and the image content from the set of multimedia in the created playlist;
    obtaining, by the hardware processor, the personal information comprising likes, dislikes, and key elements from life events of the patient; and
    correlating, by the hardware processor, the obtained contents of the set of multimedia in the created playlist and the obtained personal information to generate the narrative text using generative adversarial network (GAN) of the artificial intelligence (AI) story model.

4. The method of claim 2, wherein
    the emotional content is predicted from the image of the multimedia to calculate the emotional score for the image using the deep neural network; and
    the emotional content is predicted from the audio of the multimedia to calculate the emotional score based on a spectrogram of the audio using the deep neural network.

5. The method of claim 1, wherein the emotional arc generated based on the emotional content with the emotional score is directly proportional to the generated narrative audio, wherein the emotional content with high emotional score indicating a happy emotion to the patient is caused to increase the pitch and tone of the narrative audio, and wherein the emotional content with low emotional score indicating a sadness emotion to the patient is caused to reduce the pitch and tone of the narrative audio.

6. The method of claim 1, further comprising modulating, by the hardware processor, the generated narrative audio comprising realistic voices and speeches into patient's favorite speaker's voice in a favorite language using a generative AI model based on the personal information of the patient.

7. The method of claim 6, further comprising:
capturing, by the hardware processor, the generated emotional arc from the generated emotional score and history of the patient; and
modulating, by the hardware processor, the narrative audio with the corresponding pitch and tone in the robot's voice based on a value of the generated emotional arc.

8. A system for assisting a neurological disorders patient through a therapy session using a voice interaction with a narrative audio, wherein the neurological disorders patient is a person with neurological disorders (a patient), the system comprising:
a hardware processor; and
a memory coupled to the hardware processor, wherein the memory comprises a set of program instructions in the form of a plurality of subsystems, configured to be executed by the hardware processor, wherein the plurality of subsystems comprises:
a content extraction subsystem that is configured to extract emotional content from the set of multimedia in a playlist, wherein the playlist of content is created by an upstream therapy application;
an emotional score calculation subsystem that is configured to calculate an emotional score for each emotional content in the created playlist using a deep machine learning model, wherein the emotional content is related to at-least one of: happiness, sadness, surprise, fear, anger, disgust, and contempt;
an emotional arc generation subsystem that is configured to generate an emotional arc for each of the emotional content in the created playlist based on the calculated emotional score, a previous response from the patient to a plurality of genres and personal information of the patient, wherein the response to the plurality of genres comprises features that comprise various emotions and communications initiated by at-least one of: the patient or and caretaker of the patient;
a narrative story generation subsystem that is configured to generate a narrative text from the set of multimedia in the created playlist and to generate a narrative text story based on the generated narrative text and the personal information of the patient using an artificial intelligence (AI) story model;
a text to speech conversion subsystem that is configured to convert the generated narrative text story to an audio file; and
a narrative audio generator subsystem that is configured to generate a narrative audio by combining the audio file from the text to speech conversion subsystem with the generated emotional arc, wherein the narrative audio is modulated with corresponding pitch and tone based on a value of the generated emotional arc; and
a narrative voice output system outputs the generated narrative audio to the patient in a voice of a robot.

9. The system of claim 8, wherein the emotional score calculation subsystem, using the deep machine learning model, is configured to:
predict each of the emotional content from the set of multimedia using a deep neural network (DNN);
obtain information of the various emotions and preferences of the patient (202) that is analyzed from watch history, and personal information of the patient; and
apply a multi-layer perception (MLP) regression technique to calculate the emotional score for each of the emotional content in the created playlist based on the predicted emotional content and the obtained information.

10. The system of claim 8, wherein the narrative story generation subsystem, using the AI story model, is configured to:
obtain the at-least one of: the video content, the audio content, and the image content from the set of multimedia in the created playlist;
obtain the personal information comprising likes, dislikes, and key elements from life events of the patient; and
correlate the obtained contents of the set of multimedia in the created playlist and the obtained personal information to generate the narrative text using generative adversarial network (GAN) of the artificial intelligence (AI) story model.

11. The system of claim 9, wherein
the emotional content is predicted from the image of the multimedia to calculate the emotional score for the image using the deep neural network; and
the emotional content is predicted from the audio of the multimedia to calculate the emotional score based on a spectrogram of the audio using the deep neural network.

12. The system of claim 8, wherein the emotional arc generated based on the emotional content with the emotional score is directly proportional to the generated narrative audio, wherein the emotional content with high emotional score indicating a happy emotion to the patient is caused to increase the pitch and tone of the narrative audio, and wherein the emotional content with low emotional score indicating a sadness emotion to the patient is caused to reduce the pitch and tone of the narrative audio.

13. The system of claim 8, further comprising a voice modulation subsystem that is configured to modulate the generated narrative audio comprising realistic voices and speeches into patient's favorite speaker's voice in a favorite language using a generative AI model based on the personal information of the patient.

14. The system of claim 13, wherein the voice modulation subsystem is configured to:
capture the generated emotional arc from the generated emotional score and history of the patient; and
modulate the narrative audio with the corresponding pitch and tone in the robot's voice based on a value of the generated emotional arc.

15. The system of claim 8, further comprising a display unit that is configured to display a curated playlist for the patient.

* * * * *